Oct. 8, 1957 M. O. LINDLEY 2,808,810
LOCKING MECHANISM FOR RETRACTABLE AIRCRAFT LANDING GEAR
Filed Nov. 18, 1953 2 Sheets-Sheet 1

INVENTOR.
MACK O. LINDLEY
BY
J. H. Murray
AGENT

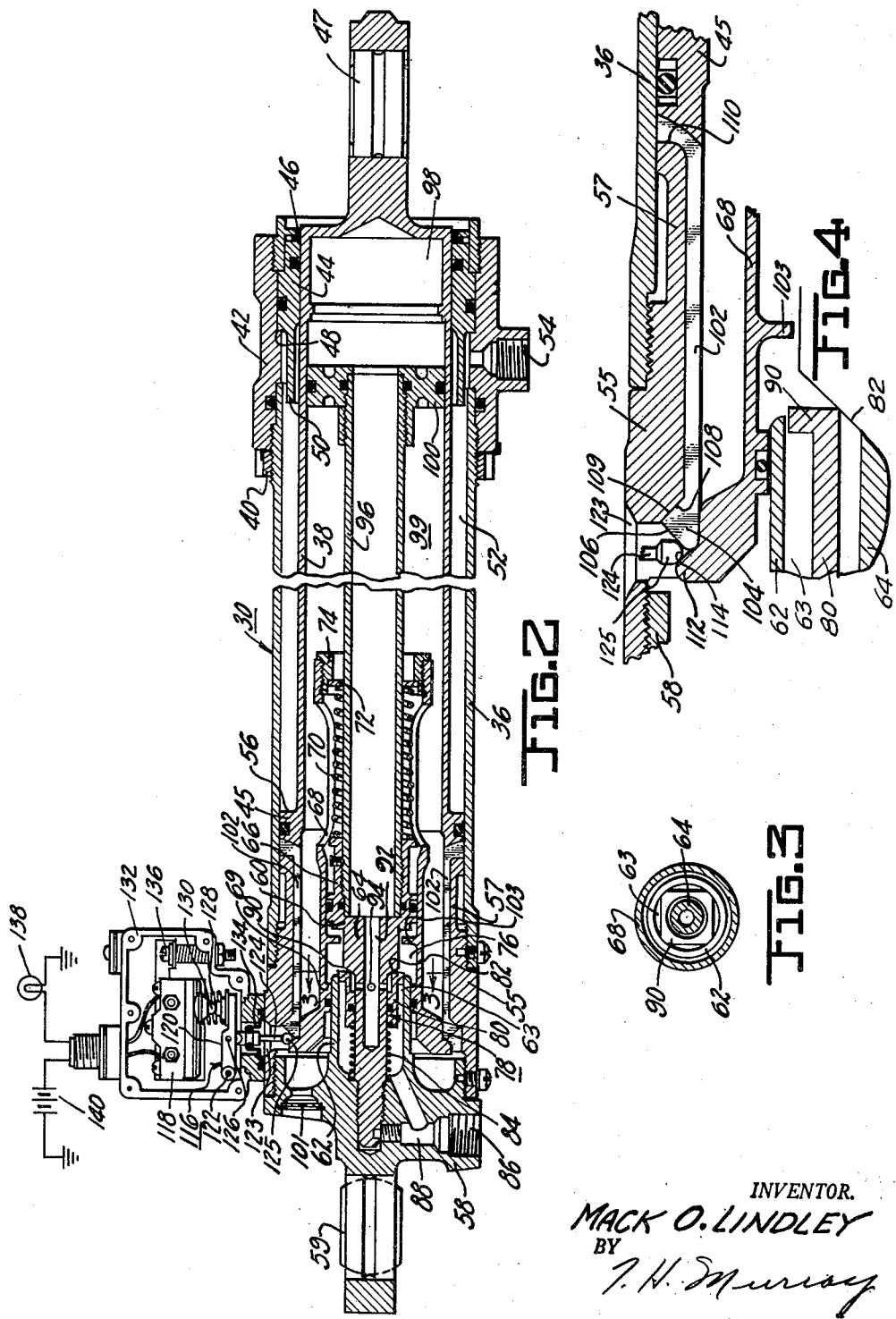

United States Patent Office 2,808,810
Patented Oct. 8, 1957

2,808,810

LOCKING MECHANISM FOR RETRACTABLE AIRCRAFT LANDING GEAR

Mack O. Lindley, South Bend, Ind., assignor to Bendix Aviation Corporation, South Bend, Ind., a corporation of Delaware Application November 18, 1953, Serial No. 392,863

18 Claims. (Cl. 121—40)

This invention relates to a device for locking the power unit of a retractable aircraft landing gear and more particularly to a locking device for a double-acting power unit which will permit the component parts of the power unit to become unlocked before allowing fluid pressure to move one part with respect to the other.

The power unit used in connection with the present invention acts as a double-acting piston and cylinder combination for retracting or extending the landing gear from flight position to landing position; and it also acts as a brace between the landing strut and wing structure for carrying drag loads on the landing wheel. As will become apparent from the following description, it is necessary that the power unit, in order to carry drag loads, be equipped with a device for locking the piston with respect to the cylinder. The locking device of the present invention is of the type having circumferentially distributed friction elements carried by the piston to be engaged by a detent formed on the outer cylinder wall. In order to lock the piston and cylinder it is necessary to hold the elements against the detent in frictional engagement. For this purpose a hydraulically actuated sleeve is forced between a set of fingers to hold them in frictional engagement with the detent. If an attempt is made to unlock the fingers (move the sleeve from between the fingers) while pressurizing the piston of the unit, high rubbing pressures will result on the fingers so that it becomes necessary to rely on low unlocking pressures to reduce the aforesaid rubbing pressures. However, low unlocking pressures are dangerous and lead to inadvertent unlocking and malfunction or collapse of the gear during landing.

It is, therefore, an object of this invention to provide a suitable hydraulic locking device for a double-acting power unit which can utilize high unlocking pressures.

Another object of the invention is to provide a locking device for a hydraulic piston and cylinder combination which will become unlocked before allowing fluid pressure to act on the piston.

An important feature of the invention is the provision of a switch mechanism which will actuate a signal in the control cockpit of the aircraft when the aforesaid locking device is out of its locked position.

The above and other objects and features of the invention will become apparent from the following description taken in connection with the accompanying drawings which form a part of this specification and in which:

Figure 2 is a section taken along the axis of the drag brace represented by line 2—2 of Figure 1;

Figure 3 is a section taken along line 3—3 of Figure 2; and

Figure 4 is an enlarged section of Figure 2 showing the locking fingers of the drag brace.

Figure 1:
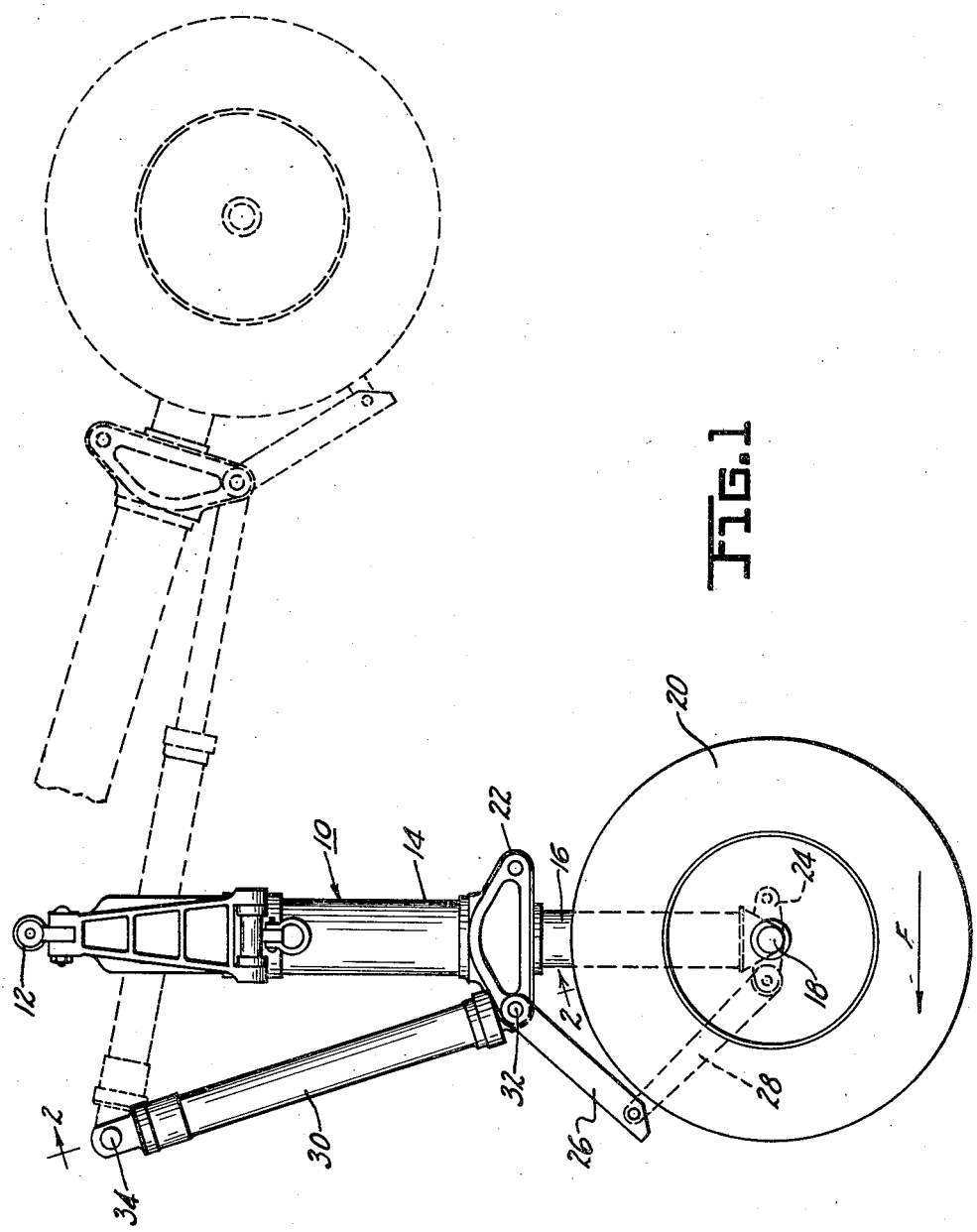
Figure 1 is a view of an airplane landing gear employing a hydraulic drag brace which embodies the features of the present invention.

In Figure 1 is shown a conventional aircraft landing gear with which the present invention may be used. The landing gear includes a shock absorbing strut 10 which is pivoted at its upper extremity 12 to the underside of an aircraft. The shock absorbing function of the strut is accomplished in a well known method by means of a pair of telescoping cylinders 14 and 16. A transversely extending axle 18 is carried at the lower extremity of cylinder 16 for supporting a wheel 20. A bracket 22, secured to the lower extremity of cylinder 14, and lugs 24 mounted on cylinder 16 are interconnected with a pair of torque arms 26 and 28 which serve to prevent relative rotation between cylinders 14 and 16 while permitting the aforesaid telescoping action.

A hydraulic drag strut 30, which serves as the power unit for retracting the wheel and strut into the aircraft, is carried for arcuate motion between pivot 32 on bracket 22 and pivot 34 fastened to the underside of the aircraft. As will hereinafter be more fully explained, the drag strut comprises, essentially, a tube piston carried within a cylinder chamber so that the unit can expand in length and force the landing gear to swing up into the aircraft. Forward motion of the wheel is indicated by the direction of arrow F. Retraction of the strut and wheel is in an arc away from the direction of forward motion so that the retracted position of the wheel and strut will be substantially that shown in dotted lines. Note that the drag strut has expanded to almost twice its compressed length in retracting the strut. In the extended position of the landing gear (shown in full lines) some means must be provided to lock the drag strut in order that it will not collapse when the aircraft alights on the ground. That is, the drag strut must be locked in order that it can take the friction drag of the wheel which would otherwise tend to rotate the landing gear about pivot 12. The locking means for the strut comprises the principal part of this invention.

Referring to Figure 2, the drag strut 30 comprises an outer cylinder 36 within which a tube piston 38 is received for reciprocating movement. On the right end of the outer cylinder are received a lock nut 40 and a sleeve 42 which acts as a housing for a bearing 44. The right end of piston 38 is slidably received within bearing 44, and the left end slides on the inner peripheral surface of cylinder 36 by means of an annular projection 45 extending radially outwardly from the piston. At the right end of the piston is formed a clevis 47 which serves as a means for connecting the piston to pivot 32 as shown in Figure 1. A packing nut 46 holds bearing 44 against a shoulder 48 formed in sleeve 42. Integral with bearing 44 and inwardly extending therefrom is an annular projection 50 which limits travel of the tube-piston to the right by abutment with projection 45.

Note that between outer cylinder 36 and tube-piston 38 there is formed an annular, axially extending cavity 52 which communicates with a pressure port 54 formed in sleeve 42. Fluid pressure injected into cavity 52 through port 54 will react against annular surface 56 of projection 45 to force the piston to the left, assuming that the piston is not in its fully retracted position as shown in Figure 2.

Threadedly received on the left end of cylinder 36 are a sleeve 55 which has a greater thickness than the cylinder so as to form an inward axially extending projection or detent 57, and an end closure 58 which has an inward extension 60. A second clevis 59 serves to link cylinder 30 to pivot 34 carried on the aircraft. The inward extension is made up of several sections including a skirted portion 62 and a reduced diameter portion 64 which extends through the skirted portion to threadedly engage end closure 58. Slidably received on the outer peripheral surface of skirted portion 62 and the innermost end 66 of extension 60 is a lock sleeve 68, the purpose of which will hereafter be explained. A coil spring 70, interposed between end 66 and a retaining washer 72, tends to force the lock sleeve to the right as shown in Figure 2. Retaining washer 72 is held against spring 70 by a retaining nut 74 which is threaded into the right end of the lock sleeve.

In the cavity 76, formed between lock sleeve 68 and reduced diameter portion 64, is carried a valve mechanism 78. The valve mechanism comprises a sleeve valve element 80, slidable on reduced diameter portion 64, and an associated annular valve seat 82 integrally formed in said reduced diameter portion. A spring 84 is employed to normally hold valve element 80 on its associated valve seat. Cavity 76 is connected to a second pressure port 86 through passage 88 and the chamber formed within skirted portion 62. In Figure 3 it can be seen that the annular flange 90 formed in valve element 80 is substantially square in cross-section, having rounded edges at its four corners to facilitate reciprocation within skirted portion 62. With this configuration, fluid can flow from port 86 to cavity 76 through passages 63 formed between the flange and skirted portion 62. Formed in lock sleeve 68 and within cavity 76 is an annular surface 69 on which fluid pressure can act to move the lock sleeve to the left against the action of spring 70.

Centrally disposed within reduced diameter portion 64 is a bore 92. A number of radially extending holes 94 provide a passage between bore 92 and cavity 76 when valve element 80 and valve seat 82 are separated. Threaded onto extension 60 is a centrally disposed conduit 96 which communicates with bore 92 and serves to conduct fluid under pressure to the right end of piston 38. An expanding fluid chamber 98, formed between the right end of piston 38 and wall 100, extends in length and fills with fluid as the piston moves to the right. Wall 100 is threaded onto conduit 96 as shown. Between conduit 96 and piston 38 is an annular chamber 99 which communicates with the atmosphere through a filter assembly 101 inserted into the left end of cylinder 36.

In order to establish communication between expanding chamber 98 and pressure port 86 it is, of course, necessary that valve mechanism 78 be open. To open the valve an annular, inwardly extending projection 103 is provided on the inner surface of lock sleeve 68. Fluid pressure injected into cavity 76 through port 86 and passage 88 will react against annular surface 69 to force the lock sleeve to the left. Movement of the lock sleeve to the left will cause projection 103 to engage flange 90 to thereby unseat valve element 80 from its associated valve seat and establish communication between port 86 and chamber 98.

At the left end of piston 38 and within chamber 99 are a plurality of flexible, axially extending locking fingers 102. Each finger has a fixed end integral with the piston and a free end formed to slide over detent 57 of sleeve 55. As shown in Figure 4, the free end of each finger comprises a radially outwardly extending projection or barb 104 having a pair of annularly disposed surfaces 106 and 108. Upon movement of the piston to the left from an extended position, surface 106 will strike abutment 110 on detent 57 to thereby flex the fingers radially inward in what might be termed a cam action. Upon further movement of the piston, the free ends of the fingers will slide over detent 57 until they reach the left end thereof. At this point the fingers will spring radially outward so that surface 108 abuts surface 109 of detent 57 as shown in Figure 4. The fingers by themselves do not lock the piston to cylinder 36. Tension loads on the fingers can force the free ends of the fingers to flex radially inward due to the cam action of cooperating surfaces 108 and 109. After the free ends of the fingers have flexed inwardly, the piston is free to move to the right. In order to lock the piston and cylinder together, lock sleeve 68 is used in cooperation with fingers 102. The lock sleeve is formed with a flange 112 which abuts the free ends 104 of the fingers to hold them securely against surface 109 due to the action of spring 70.

Operation of the device is as follows: assuming that the locking fingers are in the position shown in Figures 2 and 4, fluid pressure applied to port 86 through passage 88, past flange 90 and into cavity 76 will act on surface 69 thereby forcing lock sleeve 68 to the left. Note that the unit does not begin to expand until the lock sleeve is completely out of contact with the locking fingers. That is, projection 103 will not lift valve element 80 from its associated valve seat to allow fluid pressure to act on the piston until after flange 112 has moved away from free ends 104. This sequence action eliminates the high rubbing pressures on the surfaces of the fingers that would occur if an attempt were made to unlock (move the lock sleeve) while pressurizing chamber 98. After the fingers 102 are unlocked and valve element 80 is lifted from valve seat 82, chamber 98 will be pressurized to thereby move piston 38 to the right.

Now, assuming that the unit is in its extended position, fluid pressure applied to port 54 will act on surface 56 to move the piston to the left. Locking of the unit will be automatic. Fingers 102 will flex radially inward after contact with abutment 110 and will freely slide over detent 57 until the ends of the fingers make contact with cam surface 114 of flange 112. Further movement of the fingers will carry the lock sleeve to the left against the action of spring 70 until the locking fingers can slide into their position shown in Figure 2. When the fingers spring outwardly, lock sleeve 68 will be forced to the right by spring 70 to hold the ends of the fingers in abutment with surface 109. Tension loads on the piston can now be taken by surface 109 and compression loads by abutment 110.

A lever mechanism 116 cooperates with locking fingers 102 and sleeve 68 in order to actuate a micro switch 118 when the fingers and sleeve are not in locked position. The lever mechanism comprises an actuator lever 120 having a fulcrum at 122, and a push rod 124 pivotally carried on the lever at 126. Push rod 124 extends through an aperture 123 formed in sleeve 55 and has a rounded end 125 which extends into a notch formed in the abutment between fingers 102 and sleeve 68. A coil spring 128 is interposed between the end of the lever and a spring-loaded plunger 130 of the micro switch. The entire switch, push rod and lever assembly is carried within a housing 132 which is fastened to cylinder 36 by any suitable means, not shown. Between the chambers defined by the cylinder 36 and housing 132 is interposed a rubber diaphragm 134 which acts as a sealing means. An adjusting screw 136 serves as a means for adjusting the distance between the end of lever 120 and plunger 130.

As shown in Figure 2, the contact points of switch 118 are separated. If either the fingers or lock sleeve is not in its locked position shown in Figure 2, the push rod will no longer have end support in the notch which is formed during abutment only. Push rod 124 will, therefore, be free to pivot about 126, and lever 120 will move downward due to the action of spring 128. Downward movement of the lever will allow plunger 130 to move downward also, thereby allowing switch 118 to make contact. Upon contact of the switch, a signal such as a light 138 in the control cockpit of the aircraft will be turned on warning the pilot that the unit is not in its locked position. Current for the light is supplied by battery 140.

Although this invention has been described in connection with certain specific embodiments it will be understood by those skilled in the art that various changes can be made in the shape and arrangement of parts without departing from the spirit and scope of the invention.

Having thus described the various features of the invention, what I claim as new is:

1. In combination, a hydraulic cylinder chamber, a piston movable therein, a conduit in said cylinder chamber for conducting fluid pressure to said piston, means carried by said piston for locking the same to said cylinder chamber, a closure for an end of the cylinder chamber, said closure having an inward extension, a fluid pressure port in said closure arranged to communicate with said conduit, a central portion formed in said inward extension with a reduced cross-sectional area, a skirt integral with one end of said extension and surrounding part of said central portion, valve means interposed between said port and conduit, said valve means comprising a valve element slidably carried on said central portion within said skirt and a valve seat formed in said central portion and on which said valve element is seatable, means forcing the valve element to seat on its associated valve seat, a locking sleeve slidably received on the outer surface of said skirt and the other end of said extension for holding said locking means in its locked position, said locking sleeve having an area on which fluid pressure can act to move the same, and means on the locking sleeve to open said valve means upon movement of the locking sleeve toward said end of the cylinder chamber, the locking sleeve, valve means, and locking means being so interrelated that application of fluid pressure to said port in the closure will react on said pressure area of the locking sleeve to first release the locking means from its locked position and then to open said valve means thereby establishing communication between said port and conduit and allowing fluid pressure to move said piston.

2. In combination with a hydraulic cylinder and a piston movable therein, a locking device for preventing relative motion between said cylinder and piston comprising a reduced diameter portion formed in one end of said cylinder, a plurality of circumferentially spaced, axially extending locking fingers carried at the end of said piston which coincides with said one end of the cylinder, said fingers having a fixed end integral with said piston and a free end formed to slide over said reduced diameter portion upon movement of the piston within the cylinder, a radially outwardly extending projection formed on the free end of each finger to engage an end of said reduced diameter portion, an end closure for said cylinder having an inward extension, a locking sleeve slidable on said inward extension for holding the outwardly extending projections of the locking fingers against said end of the reduced diameter portion to thereby lock the piston within said cylinder, said locking sleeve having an annular shoulder formed therein for abutment with said free ends of the locking fingers, means for holding said sleeve in its locking position, and means for releasing said sleeve from its locking position, said latter-mentioned means comprising a pressure chamber formed between said sleeve and a reduced cross-sectional portion of said inward extension, a source of fluid pressure connected to said pressure chamber whereby injection of pressure fluid into said chamber forces said locking sleeve to its released position, and a valve opened after the locking sleeve has moved to its released position to thereby permit fluid pressure to move said piston within the cylinder.

3. In combination, a hydraulic cylinder chamber, a piston movable therein, a conduit in said cylinder chamber for conducting fluid pressure to said piston, means carried by said piston for locking the same to said cylinder chamber, a closure for an end of the cylinder chamber, said closure having an inward extension, a fluid pressure port in said closure arranged to communicate with said conduit, a central portion formed in said inward extension with a reduced cross-sectional area, a skirt integral with one end of said extension and surrounding part of said central portion, valve means interposed between said port and conduit, said valve means comprising a valve element slidably carried on said central portion within said skirt and a valve seat formed in said central portion and on which said valve element is seatable, means forcing the valve element to seat on its associated valve seat, a locking sleeve slidably received on the outer surface of said skirt and the other end of said extension for holding said locking means in its locked position, and means on the locking sleeve to open said valve means upon movement of the locking sleeve toward said end of the cylinder chamber, the locking sleeve, valve means, and locking means being so interrelated that upon application of fluid pressure to said port in the closure the locking sleeve will be forced toward said end of the cylinder chamber to first release the locking means from its locked position and then to open said valve means thereby establishing communication between said port and conduit and allowing fluid pressure to move said piston.

4. In combination with a hydraulic cylinder and a piston movable therein, a locking device for preventing relative motion between said cylinder and piston comprising a reduced diameter portion formed in one end of said cylinder, a plurality of circumferentially spaced, axially extending locking fingers carried at the end of said piston which coincides with said one end of the cylinder, said fingers having a fixed end integral with said piston and a free end formed to slide over said reduced diameter portion upon movement of the piston within the cylinder, said free ends being formed to engage an end of said reduced diameter portion, an end closure for said cylinder having an inward extension, an element slidable on said inward extension for holding said free ends of the locking fingers against said end of the reduced diameter portion to thereby lock the piston within said cylinder, means for holding said element in its locking position, and means for releasing said element from its locking position, said latter-mentioned means comprising a pressure chamber formed between said element and a reduced cross-sectional portion of said inward extension, a source of fluid pressure connected to said pressure chamber whereby injection of pressure fluid into said chamber forces said element to its released position, and valve means opened after said element has moved to its released position to thereby permit fluid pressure to move said piston within the cylinder.

5. In combination, a hydraulic cylinder chamber, a piston movable therein, a conduit in said cylinder chamber for conducting fluid pressure to said piston, means carried by said piston for locking the same to said cylinder chamber, a closure for an end of the cylinder chamber, said closure having an inward extension, a fluid pressure port in said closure arranged to communicate with said conduit, a central portion formed in said inward extension having a reduced cross-sectional area, a skirt integral with one end of said extension and surrounding part of said central portion, valve means interposed between said port and conduit, said valve means comprising a valve element slidably carried on said central portion within said skirt and a valve seat formed in said central portion and on which said valve element is seatable, means forcing the valve element to seat on its associated valve seat, and a locking sleeve slidably received on said extension for holding said locking means in its locked position, the locking sleeve, valve means, and locking means being so interrelated that upon application of fluid pressure to said port in the closure the locking sleeve will be forced toward said end of the cylinder chamber to first release the locking means from its locked position and then to open said valve means thereby establishing communication between said port and said conduit and allowing fluid pressure to move said piston.

6. In combination, a hydraulic cylinder chamber, a piston movable therein, a conduit in said cylinder chamber for conducting fluid pressure to said piston, means carried by said piston for locking the same to said cylinder chamber, a closure for an end of the cylinder chamber, said closure having an inward cylindrical extension, a fluid pressure port in said closure arranged to communicate with said conduit, a reduced diameter section formed in the central portion of said inward extension, a skirt integral with one end of said extension and surrounding part of said reduced diameter portion, valve means interposed between said port and conduit, said valve means comprising an annular valve element slidable on said reduced diameter portion within said skirt and an annular valve seat formed in said reduced diameter portion and on which said valve element is seatable, means forcing the valve element to seat on its associated valve seat, a locking sleeve slidably received on the outer surface of said skirt and the other end of said extension for holding said locking means in its locked position, and means on the locking sleeve to open said valve means upon movement of the locking sleeve toward said end of the cylinder chamber, the locking sleeve, valve means, and locking means being so interrelated that application of fluid pressure to said port in the closure will force said locking sleeve toward said end of the cylinder thereby opening the valve means and allowing fluid pressure to move said piston.

7. In combination, a hydraulic cylinder chamber, a piston movable therein, a conduit in said cylinder chamber for conducting fluid pressure to said piston, means carried by said piston for locking the same to said cylinder chamber, a closure for an end of the cylinder chamber, said closure having an inward extension, a fluid pressure port in said closure arranged to communicate with said conduit, a central portion formed in said inward extension with a reduced cross-section area, valve means interposed between said port and conduit, said valve means comprising a valve seat formed in said central portion and a valve element slidable on the central portion and arranged to seat on said valve seat, and a pressure responsive locking sleeve slidably received on said inward extension for holding said locking means in its locked position, said locking sleeve, valve means, and locking means being such that upon application of fluid pressure to said port in the closure the locking sleeve will be forced toward said end of the cylinder chamber to first release the locking means from its locked position and then to open said valve means thereby establishing communication between said port and conduit and allowing fluid to pressure to move said piston.

8. In combination, a hydraulic cylinder chamber, a piston movable therein, a conduit in said cylinder chamber for conducting fluid pressure to said piston, means carried by said piston for locking the same to said cylinder chamber, a closure for an end of the cylinder chamber, said closure having an inward extension, a fluid pressure port in said closure arranged to communicate with said conduit, valve means carried by said inward extension and interposed between said pressure port and the conduit, and a pressure responsive locking sleeve slidably received on said inward extension for holding said locking means in its locked position, said locking sleeve being actuated to release said locking means upon application of fluid pressure to said port in the closure, actuation of the locking sleeve being such as to open said valve means after release of said locking means to thereby allow fluid pressure to act on and move said piston.

9. In combination, a hydraulic cylinder chamber, a piston movable therein, a conduit in said cylinder chamber for conducting fluid pressure to said piston, means carried by said piston for locking the same to said cylinder chamber, a closure for an end of the cylinder chamber, said closure having an inward extension, a fluid pressure port in said closure arranged to communicate with said conduit, valve means interposed between said port and conduit, and a pressure responsive locking sleeve slidably received on said inward extension for holding said locking means in its locked position, said locking sleeve being actuated to release said locking means upon application of fluid pressure to said port in the closure, the relationship between the locking sleeve and valve means being such that actuation of the locking sleeve will open said valve means after release of said locking means to thereby allow fluid pressure to act on and move said piston.

10. In combination, a hydraulic cylinder chamber, a piston movable therein, a conduit in said cylinder chamber for conducting fluid pressure to said piston, means carried by said piston for locking the same to said cylinder chamber, a closure for an end of the cylinder chamber, said closure having an inward extension, a fluid pressure port in said closure arranged to communicate with said conduit, a valve mechanism carried by said inward extension and arranged to control communication between said port and conduit, and means slidably received on the exterior of said extension for holding said locking means in its locked position, said valve mechanism being opened upon movement of said sliding means but only after release of said locking means.

11. In combination, a hydraulic cylinder chamber, a piston movable therein, a conduit in said cylinder chamber for conducting fluid pressure to said piston, means carried by said piston for locking the same to said cylinder chamber, a closure for an end of the cylinder chamber, said closure having an inward extension, a fluid pressure port in said closure arranged to communicate with said conduit, a valve mechanism carried by said inward extension and arranged to control communication between said port and conduit, means carried on said extension for holding said locking means in its locked position, and means carried on said holding means for opening said valve mechanism after release of said locking means.

12. In combination with a hydraulic cylinder and a piston movable therein, a locking device for preventing relative motion between said cylinder and piston comprising a reduced diameter portion formed in one end of said cylinder, a plurality of circumferentially spaced, axially extending locking fingers carried at the end of said piston which coincides with said one end of the cylinder, said fingers having a fixed end integral with said piston and a free end formed to slide over said reduced diameter portion upon movement of the piston within the cylinder, said free ends being formed to engage an end of said reduced diameter portion thereby locking the piston within said cylinder, an end closure for the cylinder, means carried by said end closure for holding said locking fingers in their locked position, and valve means for controlling application of fluid pressure to move said piston, said holding means including lost motion means operable to open said valve only after release of said locking fingers by the holding means.

13. In combination with a hydraulic cylinder and a piston movable therein, a plurality of circumferentially spaced, axially extending locking fingers carried by said piston, a projection formed on the inner periphery of said cylinder for engaging said locking fingers, a slidable element carried within said cylinder for holding said locking fingers in engagement with said projection, valve means for controlling application of fluid pressure to move said piston, said valve means being actuated by said slidable means, said slidable means being arranged to open said valve means when the slidable means has reached its releasing position after passing through a predetermined clearance, a notch formed in the abutment between said element and said locking fingers, and means for determining the locked position of the piston including a lever mechanism actuable when said element and fingers are out of abutting relationship, said lever mechanism comprising a lever, a spring urging said lever to rotate about its fulcrum, a push rod pivoted to said lever, said push rod having a free end extending into said notch to thereby hold said lever against the action of said spring, separation of the sleeve and fingers allowing the push rod to rotate on its pivot thereby permitting movement of the lever due to the action of said spring.

14. In combination with a hydraulic cylinder and a piston movable therein, a plurality of circumferentially spaced, axially extending locking fingers carried by said piston, a projection formed on the inner periphery of said cylinder for engaging said locking fingers, a slidable element carried within said cylinder for holding said locking fingers in engagement with said projection, an abutment formed on said slidable element, a notch formed on said abutment between said element and said locking fingers, and a lever mechanism actuable when said element and fingers are out of abutting relationship, said lever mechanism comprising a spring loaded lever, a push rod pivoted to said lever and having a free end extending into said notch, said spring urging said free end of the push rod into said notch whereby separation of the sleeve and fingers will allow the push rod to rotate on its pivot thereby permitting movement of the lever due to the action of said spring.

15. A lever mechanism for use with two abutting separable members comprising a lever, a spring associated with the lever urging the same to rotate about its fulcrum, a cam surface formed in the abutting surfaces of said members so that upon abutment of said members the cam surfaces will form a notch in the abutment, and a push rod pivotally carried on said lever, said push rod having a free end which extends into said notch thereby holding the lever against the action of said spring, said free end being formed such that separation of said members will allow the push rod to rotate on its pivot while said free end slides on one of said cam surfaces thereby allowing the lever to rotate about its fulcrum due to the action of said spring.

16. A lever mechanism for use with two abutting separable members comprising a lever, a spring associated with the lever urging the lever to rotate about its fulcrum, and a push rod pivotally carried on said lever, said push rod having a free end which extends into a notch formed in the abutment between said members to thereby hold the lever against the action of said spring, separation of said members removing end support for said push rod thereby allowing said spring to force the lever and push rod to rotate about their respective axes.

17. In combination, a hydraulic cylinder chamber, a piston movable therein, means for locking said cylinder and piston together, a source of fluid pressure available to act on and move said piston, normally closed valve means carried within the cylinder for controlling application of fluid pressure to said piston, means carried by said first named means operable to open said valve means only after unlocking said cylinder and piston, and means for automatically indicating the locked position of the cylinder and piston at a point remote from the cylinder and piston.

18. In combination first and second hydraulically actuated, telescoping, relatively movable tubular members, a locking device for preventing relative movement between said telescoping members comprising a stepped diameter portion formed in one end of said first member, a plurality of circumferentially spaced axially extending locking fingers carried at the end of said second tubular member which coincides with said one end of said first member, said fingers having a fixed end combined with said second member and a free end formed to slide over the stepped diameter portion upon relative movement between said members, said free ends being formed to engage an end of said stepped diameter portion, an element slidably combined with said telescoping members for holding said free ends of the locking fingers against the stepped diameter portion to thereby lock the telescoping members, means for holding said element in its locking position, and means for releasing said element from its locking position, said latter mentioned means comprising a pressure chamber formed within said stepped diameter portion of said first tubular member, a source of fluid pressure connected to said pressure chamber whereby injection of pressure fluid into said chamber forces said element to its released position, and valve means controlling the communication of fluid pressure to said pressure chamber to move said element to its released position and permit fluid pressure to produce relative movement of said relatively reciprocable members.

References Cited in the file of this patent

UNITED STATES PATENTS

| 2,349,244 | Brown | May 23, 1944 |

FOREIGN PATENTS

| 362,577 | Italy | Aug. 30, 1938 |
| 851,394 | France | Oct. 2, 1939 |
| 715,739 | Germany | Jan. 6, 1942 |
| 725,770 | Germany | Sept. 29, 1942 |
| 615,400 | Great Britain | Jan. 5, 1949 |